United States Patent
Scavone et al.

(10) Patent No.: US 9,175,617 B2
(45) Date of Patent: Nov. 3, 2015

(54) SYSTEM AND METHOD FOR CONTROLLING EXHAUST BRAKING IN A VEHICLE

(71) Applicant: GM GLOBAL TECHNOLOGY OPERATIONS LLC, Detroit, MI (US)

(72) Inventors: Luca Scavone, Moncalieri (IT); Simone Barbero, Turin (IT); Francesco Castorina, Turin (IT); Francesco Cianflone, Turin (IT); Andrea Di Giovanni, Turin (IT); Andrea De Vito, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 274 days.

(21) Appl. No.: 13/961,942

(22) Filed: Aug. 8, 2013

(65) Prior Publication Data
US 2015/0040859 A1 Feb. 12, 2015

(51) Int. Cl.
| | |
|---|---|
| F02B 37/24 | (2006.01) |
| F02D 31/00 | (2006.01) |
| F02D 41/12 | (2006.01) |
| F02D 41/14 | (2006.01) |
| F02D 41/00 | (2006.01) |

(52) U.S. Cl.
CPC .............. *F02D 31/001* (2013.01); *F02B 37/24* (2013.01); *F02D 41/0005* (2013.01); *F02D 41/0007* (2013.01); *F02D 41/12* (2013.01); *F02D 41/145* (2013.01); *F02D 41/1446* (2013.01); *F02D 41/1448* (2013.01); *F02D 2041/1433* (2013.01)

(58) Field of Classification Search
CPC .......... F02B 37/18; F02B 37/22; F02B 37/24; F02D 2009/023; F02D 41/0005; F02D 41/0007; F02D 41/12; F02D 41/145; F02D 41/1448
USPC ............ 123/320, 323, 371, 393; 60/602, 611; 701/70
See application file for complete search history.

(56) References Cited

U.S. PATENT DOCUMENTS

| | | | |
|---|---|---|---|
| 7,644,584 B2 * | 1/2010 | Leustek et al. .................. | 60/611 |
| 2010/0168976 A1 * | 7/2010 | Andrasko et al. ................ | 701/70 |
| 2010/0258080 A1 * | 10/2010 | Andrasko et al. ............. | 123/323 |

* cited by examiner

*Primary Examiner* — Stephen K Cronin
*Assistant Examiner* — Xiao Mo
(74) *Attorney, Agent, or Firm* — Quinn Law Group, PLLC

(57) ABSTRACT

A system and method can control exhaust braking in a vehicle. The vehicle includes an engine system. The engine system includes internal combustion engine, an intake manifold, a control module, an exhaust system, and a variable geometry turbocharger (VGT) having a turbine. The turbine includes turbine blades and vanes movable with respect to the turbine blades. The method includes the following: (a) receiving an exhaust brake torque request; (b) determining target pumping losses in the internal combustion engine based on the exhaust brake torque request; (c) determining a target exhaust gas pressure within the exhaust system based on the target pumping losses; and (d) determining a target vane position of the vanes based on the target exhaust gas pressure, wherein the target vane position yields an exhaust brake torque in accordance with the exhaust brake torque request.

20 Claims, 2 Drawing Sheets

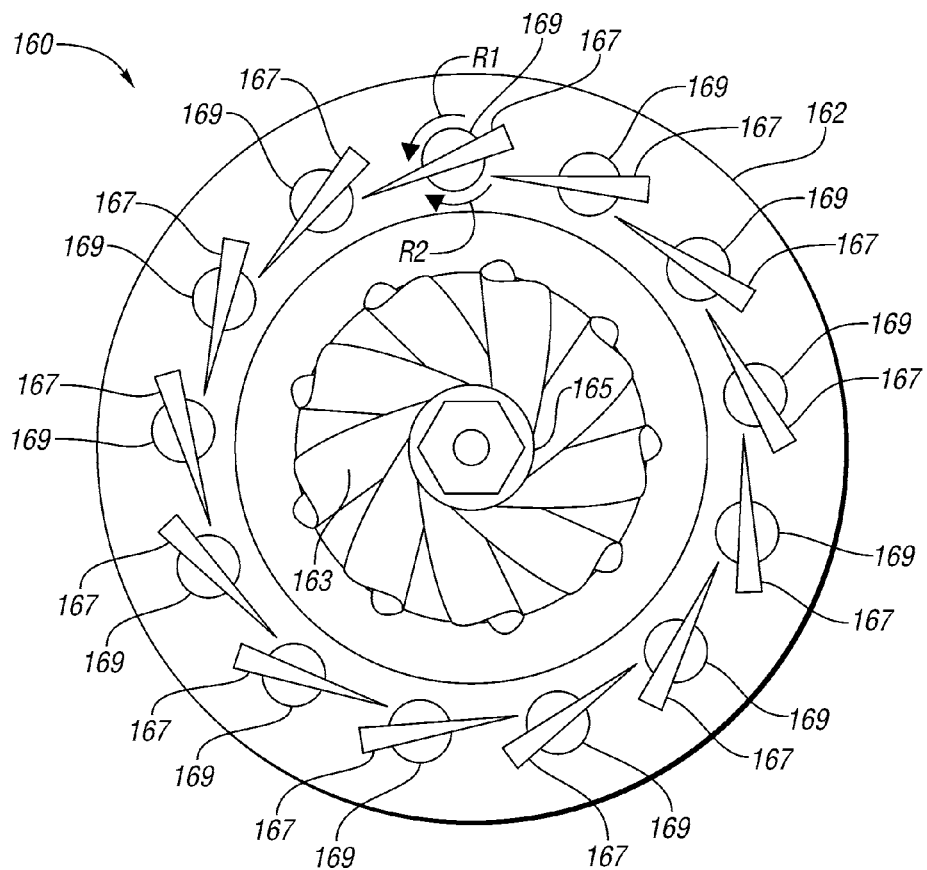
FIG. 2
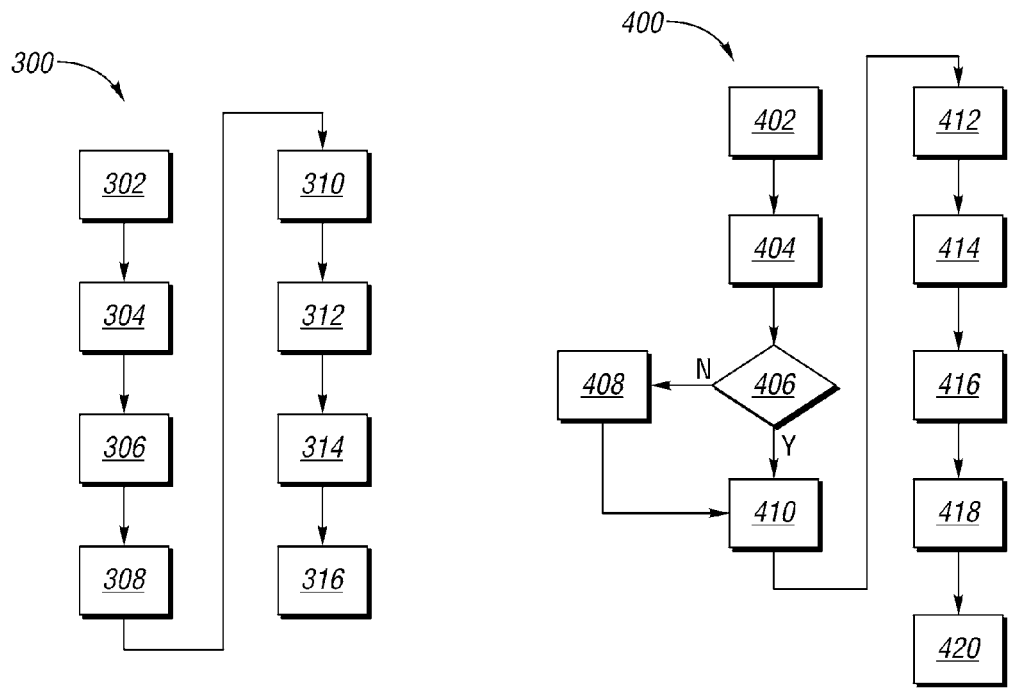
FIG. 3
FIG. 4

SYSTEM AND METHOD FOR CONTROLLING EXHAUST BRAKING IN A VEHICLE

TECHNICAL FIELD

This disclosure relates to a system and method for controlling exhaust braking in a vehicle.

BACKGROUND

Some engine systems may employ exhaust braking to decrease a speed of a vehicle in motion. As used herein, the term "exhaust braking" means a process for reducing a speed of a vehicle by increasing the pumping losses of an engine. The term "pumping losses" means the negative work done on an engine. In turn, the term "negative work done on an engine" means work that is in a direction opposite to the displacement of a piston of the engine. Accordingly, the negative work done on an engine may reduce the engine speed.

Exhaust braking may be performed, for example, by obstructing a flow of exhaust gas downstream of an engine such that the exhaust gas is compressed in an exhaust manifold of the engine system in order to generate back pressure in a combustion chamber of the engine. In this disclosure, the term "back pressure" means exhaust gas pressure in a direction from an exhaust port of an engine toward the combustion chamber of the same engine. During exhaust braking, the back pressure causes negative work on the engine.

SUMMARY

This disclosure relates to a system and method for controlling exhaust braking in a vehicle. The vehicle may include an engine system capable of employing and controlling exhaust braking in order to reduce the speed of the vehicle. The engine system may include a variable geometry turbocharger (VGT). The term "VGT" means a turbocharger that includes a turbine having turbine blades and vanes movable with respect to the turbine blades in order to adjust the flow of exhaust gas toward the turbine blades. By adjusting the position of the vanes with respect to the turbine blades, the VGT can adjust the flow of exhaust gas toward the turbine blades. The VGT can also adjust its vanes to partially or fully obstruct the flow of exhaust gas downstream of the engine in order to effect exhaust braking. It is therefore desirable to control exhaust braking by controlling the vane position of the VGT. The vane position refers to the angular position of the vanes of the VGT with respect to the turbine blades of the same VGT. To do so, the presently disclosed method and system for controlling exhaust braking utilize models as opposed to calibration maps.

A method can control exhaust braking in a vehicle. The vehicle includes an engine system that includes an internal combustion engine, an intake manifold, a control module, an exhaust system, and a variable geometry turbocharger (VGT). The VGT has a turbine that includes adjustable vanes. The method includes the following: (a) receiving an exhaust brake torque request; (b) determining, via the control module, target pumping losses in the internal combustion engine based on the exhaust brake torque request; (c) determining, via the control module, a target exhaust gas pressure within the exhaust system based on the target pumping losses; and (d) determining, via the control module, a target vane position of the vanes based on the target exhaust gas pressure. The target vane position refers to the angular position of the vanes with respect to the turbine blades and can yield an exhaust brake torque in accordance with the exhaust brake torque request. As used herein, the term "exhaust brake torque request" means a request from a vehicle operator or a cruise control system to enable exhaust braking in the engine system in order to achieve a negative brake torque desired by the vehicle operator or determined by a cruise control system. The exhaust brake torque requested by the vehicle operator may be the sum of the pumping losses, mechanical friction in the engine system, and accessory losses. As used herein, the term "accessory losses" means negative work produced by accessories driven by an engine. The term "cruise control system" means an adaptive system capable of adjusting a torque request applier, such as an accelerator pedal, in order to control a vehicle speed. The term "pumping losses" means the negative work done on an engine. The term "target pumping losses" means the pumping losses necessary to produce a negative brake torque in accordance with the exhaust brake torque request. The term "target exhaust gas pressure" means the pressure of the exhaust gas within an exhaust system upstream of the VGT that would yield the target pumping losses. The term "target vane position" means an angular position of the vanes with respect to the turbine blades of the VGT that would adjust the flow of the exhaust gas within the exhaust system such that the exhaust gas upstream of the VGT has a pressure that is equal to the target exhaust gas pressure.

A system can control exhaust braking in an engine system. The system includes an internal combustion engine and an intake manifold in fluid communication with the internal combustion engine. The intake manifold is configured to supply intake air to the internal combustion engine. The system further includes an exhaust system in fluid communication with the internal combustion engine. The exhaust system is configured to receive exhaust gases from the internal combustion engine. The system further includes a variable geometry turbocharger (VGT). The VGT includes a turbine configured to receive exhaust gases from the exhaust system. The turbine includes turbine blades and vanes movable with respect to the turbine blades. The system also includes a control module in communication with the VGT and the internal combustion engine. The control module is configured to perform the following: receive an exhaust brake torque request; determine, via the control module, target pumping losses in the internal combustion engine based on the exhaust brake torque request; determine, via the control module, a target exhaust gas pressure within the exhaust system based on the target pumping losses; and determine, via the control module, a target vane position of the vanes based on the target exhaust gas pressure. The target vane position yields an exhaust brake torque in accordance with the exhaust brake torque request.

The above features and advantages, and other features and advantages of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 2 is a schematic front view of a turbine of a variable geometry turbocharger of the vehicle shown in FIG. 1;

FIG. 3 is a flowchart of a method for determining exhaust braking torque capacity of the vehicle shown in FIG. 1; and FIG. 4 is a flowchart of a method for controlling exhaust braking in the vehicle shown in FIG. 1.

DETAILED DESCRIPTION

Figure 1:
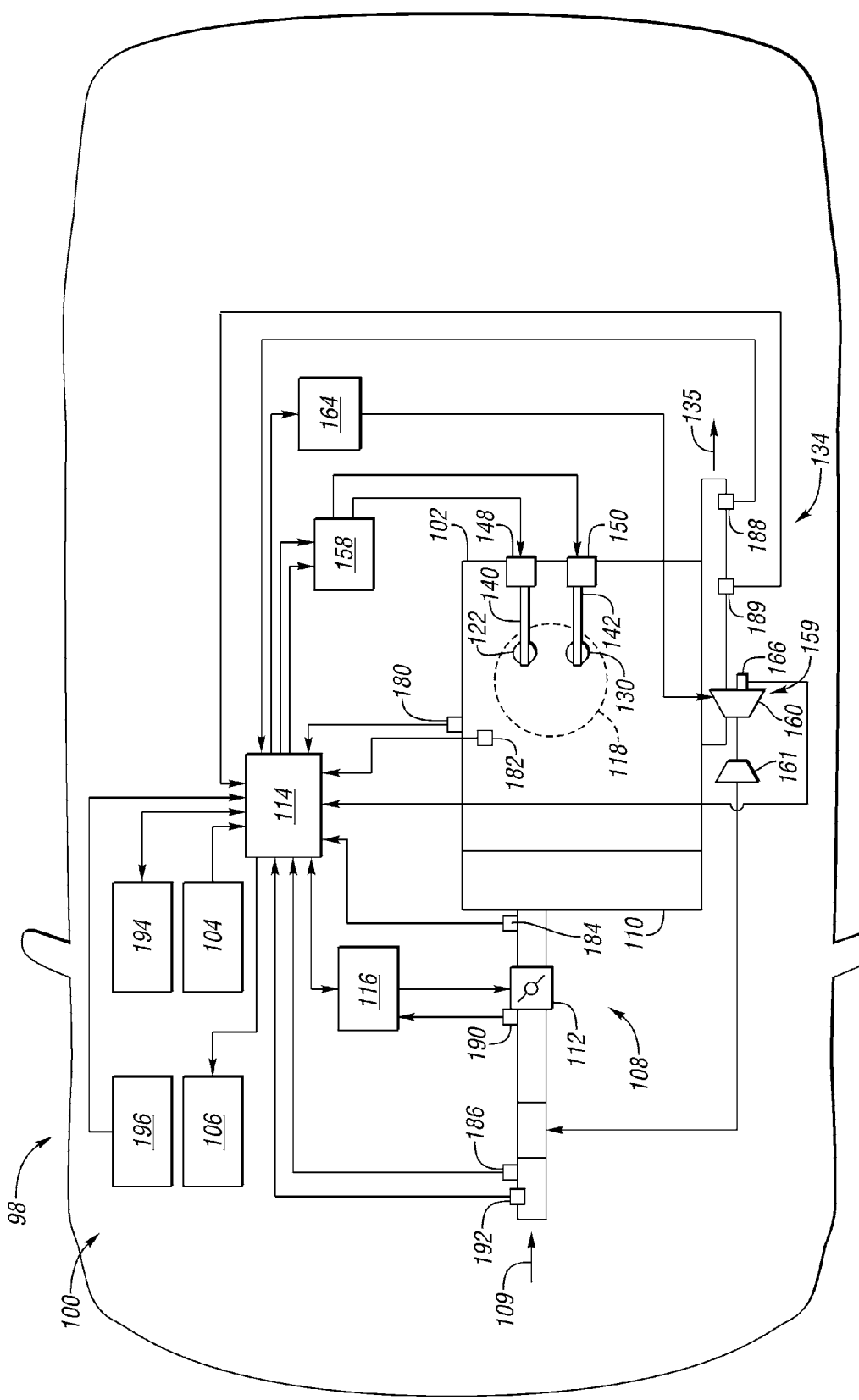
FIG. 1 is a schematic block diagram of a vehicle.

Exhaust braking may be performed by cutting off fuel delivery to cylinders of an engine and closing off an exhaust path from the engine, causing exhaust gases to be compressed in an exhaust manifold of the engine and in the cylinders of the engine. Exhaust braking may be performed when a vehicle operator's foot is removed from an accelerator pedal or any other suitable device. If the engine is equipped with a VGT, the exhaust path from the engine may be closed off by adjusting the position of vanes in the VGT. Since the exhaust gas is being compressed and fuel delivery to the cylinders is cutoff, the engine produces negative brake torque, slowing down the vehicle. The term "negative brake torque" means the torque that can reduce the engine speed. The negative brake torque may be generated by exhaust braking, accessory losses, mechanical friction in the engine, and pumping losses. As used herein, the term "accessory losses" means negative work produced by accessories driven by an engine. In this disclosure, the term "exhaust brake torque" means the negative brake torque generated by the exhaust braking. During exhaust braking, the pumping losses are increased due to the back pressure generated in the combustion chamber of the engine. The amount of exhaust brake torque generated by the engine is directly proportional to the back pressure in the engine.

In vehicles employing exhaust braking, it is important to determine the exhaust braking torque capacity of an engine system. The term "exhaust braking capacity" is the amount of negative brake torque that the engine is capable of producing when fueling to cylinders of the engine is cutoff and the vane position of the turbocharger is adjusted to yield maximum allowable exhaust braking. The presently disclosed method and system can determine the exhaust braking torque capacity and can control exhaust braking in an engine system.

As discussed above, in a vehicle with a variable geometry turbocharger, the exhaust path from the engine may be closed off by adjusting the position of vanes in the turbocharger. It is therefore important to determine how the vane should be positioned with respect to the turbine to achieve the negative brake torque requested by a vehicle operator or by a cruise control system. The presently disclosed systems and methods can determine the vane position required to achieve a desired negative brake torque.

Referring now to FIG. 1, the vehicle 98 includes an engine system 100. The engine system 100 may simply be referred to as a system and includes an internal combustion engine 102. During operation, the internal combustion engine 102 combusts an air/fuel mixture to produce drive torque for the vehicle 98. The amount of drive torque produced by the engine 102 is based on an input signal from an operator input module 104. The term "operator input module" means a control module capable of receiving inputs from a vehicle operator and generating signals indicative of such operator's input to another component of the vehicle 98 such as the internal combustion engine 102. The operator input module 104 may be a control module. The terms "control module," "module," "controller," "control unit," "processor" and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. As used herein, a "control module" has set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Cycles may be executed at regular intervals, for example each 3.125, 6.25, 12.5, 25 and 100 milliseconds during ongoing engine and vehicle operation. Alternatively, algorithms may be executed in response to the occurrence of an event.

The operator input module 104 is in electronic communication with the internal combustion engine 102. The input signal that is generated by the operator input module 104 and received by the internal combustion engine 102 may be based on a position of an accelerator pedal or any other suitable applier. The input signal generated by the operator input module 104 may also be based on a cruise control system 196. The term "cruise control system" means an adaptive system capable of adjusting a torque request applier, such as an accelerator pedal, in order to control a vehicle speed. Because exhaust braking may be useful to maintain a vehicle speed predetermined by the vehicle operator via the cruise control system, exhaust braking of the engine system 100 may be enabled or disabled based on an input signal received from the operator input module 104.

The engine system 100 may include a cruise control system 196 in electronic communication with an engine control module (ECM) 114. The cruise control system 196 can adjust a torque request applier, such as an accelerator pedal, in order to control a vehicle speed.

As discussed above, exhaust braking may also be enabled when a vehicle operator releases an accelerator pedal or any other suitable accelerator applier. As also discussed above, the input signal that is generated by the operator input module 104 and received by the internal combustion engine 102 may be based on a position of an accelerator pedal or any other suitable applier. Thus, the operator input module 104 can generate an input signal, which is referred to as exhaust brake torque request, when a vehicle operator releases the accelerator pedal or any other suitable accelerator applier. As used herein, the term "exhaust brake torque request" means a request from a vehicle operator or a cruise control system to enable exhaust braking in the engine system 100 in order to achieve a negative brake torque desired by the vehicle operator or determined by a cruise control system. The brake torque requested by the vehicle operator is equal to the pumping losses, mechanical friction, and accessory losses of the engine.

The vehicle 98 may include an exhaust braking indicator 106 capable of indicating a vehicle operator whether exhaust braking is enabled or disabled. In this disclosure, the term "exhaust braking indicator" means a device capable of delivering a message to a vehicle operator. The exhaust braking indicator 106 may be able to deliver, for example, a visual message (e.g., text), an audible message (e.g., chime), a tactile message (e.g., vibration), or a combination thereof.

In addition to the exhaust braking indictor 106, the vehicle 98 includes an intake system 108. During operation of the engine system 100, intake air 109 is drawn into the engine 102 through the intake system 108. The intake system 108 includes an intake manifold 110 and a throttle valve 112. For example, the throttle valve 112 may include a butterfly valve having a rotatable blade. The engine system 100 further includes a throttle actuator module 116 capable of regulating the opening and closing of the throttle valve 112 in order to control the amount of intake air 109 drawn into the intake manifold 110. Thus, the term "throttle actuator module" means a control module capable of controlling the operation of the throttle valve 112.

The vehicle 98 further includes the ECM 114, which is in electronic communication with the throttle actuator module 116 and internal combustion engine 102. The ECM 114 can control the operation of the throttle actuator module 116. Thus, the term "ECM" means a control module capable of controlling the operation of the internal combustion engine 102.

The internal combustion engine 102 defines one or more cylinders 118 and pistons (not shown) movable through the cylinders 118. The piston is connected to a crankshaft. In operation of the internal combustion engine 102, the reciprocating motion of the pistons along the cylinders 118 is translated into rotation of the crankshaft in order to provide torque to the vehicle 98. In one non-limiting example, the internal combustion engine 102 may operate using a four-stroke cycle. The term "stroke" means an action of a piston travelling along the full length the cylinder 118 of the internal combustion engine 102. In a four-stroke cycle, the piston strokes are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

The engine system 100 may also include an intake valve 122 capable of controlling the flow of intake air from the intake manifold 110 to the cylinders 118. For example, the intake valve 122 may move between an open position and a closed position. During the intake stroke of the internal combustion engine 102, the intake valve 122 moves from the closed position to the open position to allow air from the intake manifold 110 to be drawn into the cylinder 118.

During the combustion stroke of the piston of the internal combustion engine 102, the combustion of the air/fuel mixture drives the piston downwardly, thereby driving the crankshaft. The combustion stroke may be defined as the time between the piston reaching TDC and the time at which the piston returns to bottom dead center (BDC). After the combustion stroke, the piston of the internal combustion engine 102 moves up from BDC and expels the byproducts of combustion from the cylinder 118. The byproducts of the combustion are referred to as an exhaust gas or exhaust gases 135. The movement of the piston that expels the byproducts of combustion from the cylinder 118 is called an exhaust stroke. To expel the exhaust gas 135, the internal combustion engine 102 includes an exhaust valve 130. During the exhaust stroke, the exhaust valve 130 moves from a closed position to an open position to allow the exhaust gas 135 to exit the cylinder 118. The engine system 100 includes an exhaust system 134 in fluid communication with the internal combustion engine 102 via the exhaust valve 130. The exhaust system 134 can direct the exhaust gas 135 outside the vehicle.

The internal combustion engine 102 may additionally include an exhaust camshaft 142 for controlling the exhaust valve 130 and an intake camshaft 140 for controlling the intake valve 122. It is contemplated that multiple intake camshafts (including the intake camshaft 140) may control multiple intake valves (including the intake valve 122) for the cylinder 118. Similarly, multiple exhaust camshafts (including the exhaust camshaft 142) may control multiple exhaust valves for the cylinder 118.

The time at which the intake valve 122 and the exhaust valve 130 are opened with respect to when the piston reaches the TDC position may be varied. To do so, the engine system 100 may include an intake cam phaser 148 and an exhaust cam phaser 150. The intake cam phaser 148 is configured to adjust the time at which the intake valve 122 is opened, whereas the exhaust cam phaser 150 is configured to adjust the time at which the exhaust valve 130 is opened. The engine system 100 may further include a valve actuator module 158 capable of controlling the intake and exhaust cam phasers 148, 150 based on signals from the ECM 114. Thus, the term "valve actuator module" means a control module capable of controlling the operation of the intake cam phaser 148 and the exhaust cam phaser 150.

The engine system 100 may include a boost device that provides pressurized air to the intake manifold 110. The term "boost device" means a device capable of supplying pressurized air to the intake manifold 110. An example of a boost device is a turbocharger 159. The turbocharger 159 is part of the engine system 100 and includes a turbine 160 that is powered by hot exhaust gases 135 flowing through the exhaust system 134. The turbocharger 159 also includes an air compressor 161, driven by the turbine 160, which compresses intake air 109 flowing toward the throttle valve 112.

In the depicted embodiment, the turbocharger 159 is a variable geometry turbocharger (VGT). Accordingly, the turbocharger 159 may be referred to as the VGT. The ECM 114 may control the turbocharger 159 via a VGT actuator module 164. The term "VGT actuator module" means a control module capable of controlling the operation of the turbocharger 159. Thus, the turbocharger 159 is in communication with the ECM 114. The VGT actuator module 164 may modulate the boost of the turbocharger 159 by controlling and adjusting the position of one or more vanes 167 (FIG. 2) in the turbocharger 159. It is envisioned that the VGT actuator module 164 may include actuators, such as electric motors and shafts, in order to adjust the position of the vanes 167 of the turbocharger 159.

With reference to FIG. 2, the turbine 160 of the VGT 159 includes a support member 162, such as a plate or ring, which may be part of a turbine housing (not shown). The turbine 160 further includes a plurality of turbine blades 163 attached around a shaft 165 of the turbocharger 159. During operation of the turbine 160, the exhaust gas 135 (FIG. 1) flows towards the turbine blades 163, causing the turbine blades 163 to rotate. As a consequence, the shaft 165 of the turbocharger 159 rotates as a well. The turbine 160 further includes a plurality of adjustable vanes 167 circumferentially disposed around the turbine blades 163. The adjustable vanes 167 are rotatably coupled to the support member 162. For example, the turbine 160 may include a plurality of fasteners 169, such as pins, rotatably coupling the vanes 167 to the support member 162. The fasteners 169 can allow the vanes 167 to rotate relative to the support member 162 in a first rotational direction R1 and a second rotational direction R2, which is opposite to the first rotational direction R1. Accordingly, the vanes 167 can move simultaneously with respect to the support member 162 or the turbine blades 163 between a fully open position (i.e., minimum vane position) and a fully closed position (i.e., maximum vane position) in order to control the flow of exhaust gas 135 toward the turbine blades 163. In the fully closed position, the adjustable vanes 167 preclude exhaust gas 135 from flowing toward the turbine blades 163. Conversely, in the fully open position, the adjustable vanes 167 permit a maximum amount of exhaust gas 135 to flow toward the turbine blades 163.

With reference again to FIG. 1, the movement of the vanes 167 may be controlled by the VGT actuator module 164 (FIG. 1). The position of the vanes 167 in the turbocharger 159 may be determined or detected using a vane position sensor (VPS) 166 (FIG. 1).

With continued reference to FIG. 1, aside from the VPS 166, the engine system 100 may include other sensors. For example, the engine system 100 may include a crankshaft position (CKP) sensor 180 to determine or detect the position of the crankshaft (not shown). In addition, the engine system 100 may include an engine coolant temperature (ECT) sensor 182 to determine the temperature of the engine coolant. The ECT sensor 182 may be located within the engine 102 or at other locations where the coolant is circulated, such as a radiator (not shown).

The engine system 100 may additionally include a manifold absolute pressure (MAP) sensor 184 to determine the air pressure within the intake manifold 110. Furthermore, the engine system 100 may include a mass air flow (MAF) sensor 186 to measure the mass flow rate of air flowing into the intake manifold 110. The MAF sensor 186 may be located in a housing that also includes the throttle valve 112.

In addition to the MAF sensor 186, the engine system 100 may include an exhaust pressure (EXP) sensor 188 to measure the pressure of the exhaust gas 135 within the exhaust system 134. The EXP sensor 188 may include multiple sensors that measure pressure upstream and downstream from a particulate filter (not shown) included in the exhaust system 134. In the depicted embodiment, the EXP sensor 188 can measure the pressure of the exhaust gas 135 that has already passed through the turbine 160. In other words, the EXP sensor 188 measures the exhaust gas pressure downstream of the turbine 160. The engine system 100 also includes an exhaust temperature (EXT) sensor 189 to measure the temperature of the exhaust gas 135 within the exhaust system 134. The EXP sensor 188 and the EXT sensor 189 may be located downstream from the turbocharger's turbine 160.

As discussed above, the engine system 100 may include a throttle actuator module 116 capable of regulating the opening and closing of the throttle valve 112 in order to control the amount of intake air 109 drawn into the intake manifold 110. The engine system 100 also includes a throttle position sensor (TPS) 190 in electronic communication with the throttle actuator module 116. The TPS 190 can determine or detect the position of the throttle valve 112. Accordingly, the throttle actuator module 116 can monitor the position of the throttle valve 112 based on input signals from the TPS 190.

The engine system 100 may also include an intake air temperature (IAT) sensor 192 in electronic communication with the ECM 114. The IAT sensor 192 can measure the temperature of air 109 in the intake system 108. Accordingly, the ECM 114 can monitor the temperature of the air 109 in the intake system 109 based on input signals from the IAT 192. The ECM 114 may use signals from the sensors to make control decisions for the engine system 100. The ECM 114 may communicate with a transmission control module (TCM) 194 to coordinate shifting gears in a transmission (not shown). For example, the ECM 114 may reduce engine torque during a gear shift.

The ECM 114 may be referred to as a control module can enable and disable exhaust braking based on the driver input from the operator input module 104 and/or independent of the accelerator pedal position. For example, the ECM 114 may enable or disable exhaust braking when a vehicle operator presses a button. The ECM 114 outputs a signal indicating whether exhaust braking is enabled.

The ECM 114 includes can also determine whether exhaust braking is available based on, for example, transmission state, engine coolant temperature, and/or detection of faults in the transmission or exhaust braking hardware. The term "exhaust braking availability module" therefore means a module capable of determining whether exhaust braking is available. The ECM 114 may determine that exhaust braking is not available when the transmission is not in drive (e.g., the transmission is in park or neutral), indicating an inability to transmit torque from the engine 102 to wheels (not shown). The ECM 114 may determine that exhaust braking is not available when the engine coolant temperature is outside of a predetermined temperate range (e.g., greater than 30 degrees Celsius (° C.)). The predetermined temperature range may be selected to ensure that the temperature of oil in the engine 102 is sufficient for lubrication and, if the turbocharger 159 is oil actuated, for controlling the turbocharger 159.

The ECM 114 may determine that exhaust braking is not available when a fault is detected in the transmission or in the exhaust hardware. As used herein, the term "exhaust braking hardware" means components of the engine systems 100 that collectively allow the vehicle 98 to effect exhaust braking. As a non-limiting example, the exhaust braking hardware may include the turbocharger 159, the VPS 166, the EXP sensor 188, the EXT sensor 189, and other hardware components used to effect exhaust braking. The ECM 114 may determine the transmission state and whether a fault is detected in the transmission based on input from the TCM 194. A fault may be detected in the transmission, for example, when the output of a transmission gear selector position sensor (not shown) is outside of a predetermined range.

ECM 114 outputs a signal indicating whether exhaust braking is available. The ECM 114 may not enable exhaust braking when exhaust braking is not available. In addition, the ECM 114 may activate the exhaust braking indicator 106 when exhaust braking is not available. In turn, the exhaust braking indicator 106 may provide feedback to the vehicle operator that exhaust braking is not available.

FIG. 3 is a flowchart of a method 300 for determining the exhaust braking capacity of the engine system 100. As stated above, the term "exhaust braking capacity" is the amount of negative brake torque that the engine is capable of producing when fueling to cylinders of the engine is cutoff and the vane position of the turbocharger is adjusted to yield maximum allowable exhaust braking. The method 300 may be performed by the ECM 114 or any other suitable control module or modules.

With continued reference to FIG. 3, the method 300 begins at step 302. Step 302 entails determining a maximum vane position of the vanes 167 of the turbocharger 159. The term "maximum vane position" means an angular position of the vanes 167 with respect to the turbine blades 163 that yields the maximum allowable exhaust braking. For example, maximum vane position of the vanes 167 may be a vane position, wherein the vanes 167 (FIG. 2) are fully closed. In the fully closed position, the vanes 167 completely obstruct the flow of exhaust gas 135 (FIG. 1) toward the turbine blades 163 (FIG. 2) of the turbine 160. Information relating to the maximum vane position may already be stored in the ECM 114. After determining the maximum vane position, the method 300 continues to step 304.

Step 304 entails determining an engine speed of the internal combustion engine 102. The ECM 114 may determine the engine speed based on the input from the CKP sensor 180. After determining the engine speed, the method continues to step 306.

Step 306 entails determining the exhaust gas temperature within the exhaust system 134. The ECM 114 may determine and monitor the temperature of the exhaust gas 135 within the exhaust system 134 based on an input from the exhaust temperature (EXT) sensor 189. Thereafter, the method 300 proceeds to step 308.

Step 308 includes determining the pressure of the exhaust gas 135 downstream of the turbine 160. Thus, step 308 entails determining exhaust gas pressure downstream of the turbine 160. The exhaust gas pressure downstream of the turbine 160 may be measured using the EXP sensor 188. The ECM 114 can monitor and determine the exhaust gas pressure downstream of the turbine 160 based on an input from the EXP sensor 188. The method 300 then proceeds to step 310.

Step 310 entails determining the exhaust gas pressure upstream of the turbine 160 based on the maximum vane position determined in step 302, the engine speed determined in step 304, the exhaust gas temperature determined in step 306, and the exhaust gas pressure downstream of the turbine 160 determined in step 308. Thus, the pressure of the exhaust gas 135 upstream of the turbine 160 (i.e., the exhaust gas entering the turbine 160) is a function of the maximum vane position determined in step 302, the engine speed determined in step 304, the exhaust gas temperature determined in step 306, and the exhaust gas pressure downstream of the turbine 160 determined in step 308. The exhaust gas pressure upstream of the turbine 160 may be extracted from data sets stored in the ECM 114. The ECM 114 may use following equations to determine the exhaust gas pressure upstream of the turbine 160:

$$P_{exhaust} = \beta / P; \quad \text{Equation A}$$

wherein:
$P_{exhaust}$ is the exhaust gas pressure upstream of the turbine 160;
β is the pressure ratio coefficient of the turbine 160; and
$P_{down}$ is the exhaust gas pressure downstream of the turbine 160.

$$\dot{m}_c = \dot{m}_{turbine} \cdot \frac{\sqrt{287 \cdot T}}{P_2} \quad \text{Equation B}$$

wherein:
$\dot{m}_c$ is flow rate factor;
$\dot{m}_{turbine}$ is the measured mass flow rate through the turbine 160 (i.e., air flow plus fuel flow);
T is the exhaust gas temperature upstream of the turbine 160; and
$P_2$ is the estimated absolute pressure at the turbine outlet.

The pressure ratio coefficient β used in Equation A may be extracted from a lookup table that is indexed by is the vane position of the turbocharger 159 and the flow rate factor $_c$. The Equation B may be used to determine the flow rate factor $_c$. After determining the exhaust gas pressure upstream of the turbine 160 at step 310, the method 300 continues to step 312.

At step 312, the exhaust gas pressure upstream of the turbine 160 (as determined in step 310) may be limited based on a hardware limitation of the exhaust system 134. For instance, the exhaust gas pressure should not exceed pressures that could render the turbine 160 inoperable for its intended purpose. Accordingly, step 312 entails limiting the exhaust gas pressure upstream of the turbine 160 to a maximum exhaust gas pressure in light of the hardware limitation of the exhaust system 134 and the maximum vane position. Thus, step 312 entails determining the maximum exhaust gas pressure within the exhaust system 134 based on the maximum vane position and hardware limitation. After determining the maximum exhaust gas pressure, the method 300 proceeds to step 314.

Step 314 entails determining the pressure of the intake air 109 entering the cylinders of the engine 102 (i.e., the boost pressure). The intake air pressure entering the cylinders of the engine 102 may be equal to the intake air pressure within the intake manifold 110. Accordingly, the pressure within the intake manifold 110 may be measured using the MAP sensor 184. In other words, the ECM 114 may determine and monitor the pressure of the intake air 109 entering the cylinders of the engine 102 based on the input from the MAP sensor 184. Thus, step 314 entails determining the intake air pressure in the intake manifold 110. Next, the method proceeds to step 316.

Step 316 entails determining the maximum pumping losses of the internal combustion engine 102. The term "pumping losses" means the negative work done on an engine. The term "maximum pumping losses" is the amount of pumping losses generating during an exhaust braking process when fueling to cylinders of the engine 102 is cutoff and the vane position of the turbocharger 159 is adjusted to yield maximum allowable exhaust braking. The maximum pumping losses of the engine 102 can be translated into torque in order to determine the exhaust braking capacity. As discussed above, the term "exhaust braking capacity" means the amount of negative brake torque that the engine is capable of producing when fueling to cylinders of the engine is cutoff and the vane position of the turbocharger 159 is adjusted to yield maximum allowable exhaust braking. The maximum pumping losses may be a function of the maximum exhaust gas pressure determined in step 312, the engine speed determined in step 304, and the intake air pressure determined in step 314. In other words, the maximum pumping losses may be based on the engine speed, maximum exhaust gas pressure, and intake air pressure. Accordingly, the maximum pumping losses may be determined using the following equations:

$$W_{pump} = \int_{intake}^{exhaust} p\, dV = \left(\overline{P}_{In-CylExh} - \overline{P}_{Intake}\right) \cdot V \quad \text{Equation C}$$

wherein:
$W_{pump}$ is pumping losses;
$\overline{P}_{In-CylExh}$ is the average exhaust gas pressure considering the pressure losses in the exhaust valve;
$\overline{P}_{Intake}$ is the average intake air pressure considering the pressure losses in the intake valve; and
V is the cylinder volume of the engine 102.
wherein:

$$\overline{P}_{Intake} = K1 \cdot P_{Intake} \quad \text{Equation D}$$

$\overline{P}_{Intake}$ is the average intake air pressure considering the pressure losses in the intake valve;
$P_{Intake}$ is the intake air pressure; and
K1 is a constant that is dependent on the engine speed.

$$\overline{P}_{In-CylExh} = K2 \cdot P_{exhaust} \quad \text{Equation E}$$

$\overline{P}_{In-CylExh}$ is the average exhaust gas pressure considering the pressure losses in the exhaust valve;
$P_{exhaust}$ is the exhaust gas pressure upstream of the turbine 160; and K2 is a constant that is dependent on the engine speed.

FIG. 4 is a flowchart of method 400 for controlling an exhaust braking in the vehicle 98. The method begins at step 402. At step 402, the ECM 114 receives an exhaust braking torque request. Thus, step 402 entails receiving an exhaust brake torque request. As used herein, the term "exhaust brake torque request" means a request from a vehicle operator or a cruise control system to enable exhaust braking in the engine system in order to achieve a negative brake torque desired by the vehicle operator or determined by a cruise control system. For example, the ECM 114 may receive an exhaust braking torque request when the vehicle operator removes a foot from the accelerator pedal or any other suitable accelerator applier. The brake torque requested by the vehicle operator may be equal to the pumping losses, mechanical friction, and accessory losses of the engine system 100. The ECM 114 may also receive an exhaust brake torque request when the accelerator pedal (or any other suitable accelerator applier) is positioned at low accelerator pedal values, such as when the vehicle is idling or coasting down from a higher speed. After the ECM 114 receives the exhaust braking torque request, the method 400 proceeds to step 404.

Step 404 includes determining, via the ECM 114, the target pumping losses in the internal combustion engine 102 based on the exhaust braking torque request. The term "target pumping losses" means the pumping losses necessary to produce a negative brake torque in accordance with the exhaust brake torque request. In other words, at step 404, the ECM 114 determines the pumping losses in the engine 102 that are required in order to achieve the braking torque requested by the vehicle operator or the cruise control system 196. The ECM 114 may use Equations C, D, and E to determine the target pumping losses. The method 400 then proceeds to step 406.

Step 406 includes comparing the target pumping losses to the maximum pumping losses of the engine 102 previously determined using the method 300. Specifically, the ECM 114 determines if the target pumping losses is less than or equal to the maximum pumping losses available. If the target pumping losses is not less or equal to the maximum pumping losses, then the method 400 proceeds to step 408. At step 408, the ECM 114 limits the target pumping losses to the maximum pumping losses available such that the target pumping losses are equal to the maximum pumping losses available. Thus, step 408 entails limiting, via the ECM 114, the target pumping losses to the maximum pumping losses of the internal combustion engine 102 if the target pumping losses are greater than the maximum pumping losses. After limiting the target pumping losses to the maximum pumping losses available, the method 300 proceeds to step 410. If the target pumping losses is less than or equal to the maximum pumping losses available, then the method 400 continues to step 410.

Step 410 entails determining the engine speed. The ECM 114 may determine the engine speed based on the input from the CKP sensor 180. After determining the engine speed, the method continues to step 412.

Step 412 entails determining the pressure of the intake air 109 entering the cylinders of the engine 102 (i.e., the boost pressure). The intake air pressure entering the cylinders of the engine 102 may be equal to the intake air pressure within the intake manifold 110. Accordingly, the pressure within the intake manifold 110 may be measured using the MAP sensor 184. In other words, the ECM 114 may determine the pressure of the intake air entering the cylinders of the engine 102 based on the input from the MAP sensor 184. Next, the method proceeds to step 414.

Step 414 entails determining a target exhaust gas pressure upstream of the turbine 160 based on the engine speed determined in step 410, the intake air pressure determined in step 412, and the target pumping losses determined in step 404. The term "target exhaust gas pressure" means the pressure of the exhaust gas within an exhaust system 134 upstream of the VGT that would yield the target pumping losses. The target exhaust gas pressure (i.e., the pressure of the exhaust gas entering the turbine 160) is a function of the engine speed determined in step 410, the intake air pressure determined in step 412, and the target pumping losses determined in step 404 or in step 408. The target exhaust gas pressure upstream of the turbine 160 may be extracted from data sets stored in the ECM 114. Also, the ECM 114 may use Equations A and B to determine the target exhaust gas pressure upstream of the turbine 160. Thus, step 414 entails determining, via the ECM 114, the target exhaust gas pressure within the exhaust system 134 based on the target pumping losses. Next, the method 400 continues to step 416.

Step 416 entails determining exhaust gas temperature in the exhaust system 134. The ECM 114 may measure the temperature of the exhaust gas within the exhaust system 134 based on the input from the exhaust temperature (EXT) sensor 189. Thereafter, the method 400 proceeds to step 418.

Step 418 includes determining, via the ECM 114, a target vane position of the turbine 160 based on the target exhaust gas pressure determined in step 414, the engine speed determined in step 410, and the exhaust gas temperature determined in step 416. The term "target vane position" means a position of the vanes of the turbocharger 159 (i.e., the VGT) that would adjust the flow of the exhaust gas within the exhaust system such that the exhaust gas upstream of the turbocharger 159 has a pressure that is equal to the target exhaust gas pressure. Thus, at step 418, the ECM 114 determines the vane position that yields the braking torque requested by the vehicle operator or cruise control system 196 (i.e., the target vane position). In other words, step 418 entails determining, via the ECM 114, the target vane position of the vanes 167 in accordance with the exhaust brake torque request. The method then proceeds to step 420.

Step 420 entails adjusting the vanes of the turbocharger 159 such that the vanes are positioned in the target vane position determined in step 418 in order to reduce the speed of the vehicle 98. The target vane position is an angular position of the vanes 167 with respect to the turbine blades 163. Thus, step 420 entails adjusting the vanes 167 of the turbocharger 159 to the target vane position. At step 420, the ECM 114 may send a command signal to the VGT actuator module 164. In response to this command signal from the ECM 114, the VGT actuator module 164 adjusts a position of the adjustable vanes 167 of the turbocharger 159 (i.e., the VGT) such that the vanes 167 are positioned in the target vane position determined in step 418. By using the method 400, the ECM 114 does not need to save memory space for calibration data and does not need to spend time determining the desired vane position based on the calibration maps. By controlling exhaust braking using the engine system 100 and the method 400, the vehicle operator's comfort may be enhanced when the vehicle 98 has a trailer and is driving downhill.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

The invention claimed is:

1. A method for controlling exhaust braking in a vehicle that includes an internal combustion engine, an intake manifold, a control module, an exhaust system, and a variable geometry turbocharger (VGT) including a turbine, the turbine including turbine blades and vanes movable with respect to the turbine blades, the method comprising:
   receiving an exhaust brake torque request;
   determining, via the control module, target pumping losses in the internal combustion engine based on the exhaust brake torque request;
   determining, via the control module, a target exhaust gas pressure within the exhaust system based on the target pumping losses;
   determining, via the control module, a target vane position of the vanes based on the target exhaust gas pressure, wherein the target vane position yields an exhaust brake torque in accordance with the exhaust brake torque request; and
   adjusting the vanes of the VGT such that the vanes are positioned in the target vane position in order to reduce a speed of the vehicle, wherein the target vane position is an angular position of the vanes with respect to the turbine blades.

2. The method of claim 1, further comprising determining an engine speed of the internal combustion engine.

3. The method of claim 2, further comprising determining an intake air pressure in the intake manifold.

4. The method of claim 3, wherein the target exhaust gas pressure is based on the engine speed, the target pumping losses, and the intake air pressure.

5. The method of claim 4, further comprising determining an exhaust gas temperature within the exhaust system.

6. The method of claim 5, wherein the target vane position is based on the engine speed, the target exhaust gas pressure, and the exhaust gas temperature.

7. The method of claim 1, further comprising determining maximum pumping losses of the internal combustion engine.

8. The method of claim 7, further comprising limiting the target pumping losses to the maximum pumping losses of the internal combustion engine if the target pumping losses are greater than the maximum pumping losses.

9. The method of claim 8, wherein determining the maximum pumping losses includes:
   determining a maximum vane position of the vanes that yields a maximum allowable exhaust braking; and
   determining a maximum exhaust gas pressure within the exhaust system based on the maximum vane position.

10. The method of claim 9, further comprising:
    determining an engine speed of the internal combustion engine;
    determining an exhaust gas pressure downstream of the turbine; and
    determining an exhaust gas temperature within the exhaust system.

11. The method of claim 10, wherein the maximum exhaust gas pressure is based on the engine speed, the exhaust gas pressure downstream of the turbine, and the exhaust gas temperature within the exhaust system.

12. The method of claim 11, further comprising determining an intake air pressure in the intake manifold, wherein the maximum pumping losses are based on the engine speed, the maximum exhaust gas pressure, and the intake air pressure.

13. A system, comprising:
    an internal combustion engine;
    an intake manifold in fluid communication with the internal combustion engine, the intake manifold being configured to supply intake air to the internal combustion engine;
    an exhaust system in fluid communication with the internal combustion engine, the exhaust system being configured to receive exhaust gas from the internal combustion engine;
    a variable geometry turbocharger (VGT) including a turbine configured to receive exhaust gas from the exhaust system, the turbine including turbine blades and vanes movable with respect to the turbine blades; and
    a control module in communication with the VGT and the internal combustion engine, the control module being configured to:
       receive an exhaust brake torque request;
       determine, via the control module, target pumping losses in the internal combustion engine based on the exhaust brake torque request;
       determine, via the control module, a target exhaust gas pressure within the exhaust system based on the target pumping losses; and
       determine, via the control module, a target vane position of the vanes based on the target exhaust gas pressure, wherein the target vane position is an angular position of the vanes with respect to the turbine blades, and the target vane position yields an exhaust brake torque in accordance with the exhaust brake torque request.

14. The system of claim 13, further comprising a VGT actuator module configured to adjust an angular position of the vanes with respect to the turbine blades such that the vanes are positioned in the target vane position.

15. The system of claim 13, wherein the control module is configured to determine an engine speed of the internal combustion engine.

16. The system of claim 15, wherein the control module is configured to determine an intake air pressure in the intake manifold.

17. The system of claim 16, wherein the target exhaust gas pressure is based on the engine speed, the target pumping losses, and the intake air pressure.

18. The system of claim 17, wherein the control module is configured to determine an exhaust gas temperature within the exhaust system.

19. The system of claim 18, wherein the target vane position is based on the engine speed, the target exhaust gas pressure, and the exhaust gas temperature.

20. The system of claim 13, wherein the control module is configured to:
    determine maximum pumping losses of the internal combustion engine; and
    limit the target pumping losses to the maximum pumping losses of the internal combustion engine if the target pumping losses are greater than the maximum pumping losses.

* * * * *